United States Patent [19]

Ferriss

[11] Patent Number: 4,624,791

[45] Date of Patent: Nov. 25, 1986

[54] METHOD FOR IMPROVING BUBBLE SURFACE AREA EXPOSURE

[76] Inventor: Jon S. Ferriss, P.O. Box 221, Whitehouse Station, N.J. 08889

[21] Appl. No.: 754,954

[22] Filed: Jul. 15, 1985

[51] Int. Cl.⁴ .............................. C02F 1/24; C02F 1/72; C02F 1/76

[52] U.S. Cl. .................................. 210/704; 210/218; 210/220; 210/221.2; 210/754; 210/758; 55/196; 55/233; 55/387

[58] Field of Search ................................ 210/703–706, 210/218, 220, 221.2, 754, 758; 261/122; 209/170, 166; 55/196, 233, 387, 95, 255, 256

[56] References Cited

U.S. PATENT DOCUMENTS

| | | | |
|---|---|---|---|
| 3,179,252 | 4/1965 | Vrablik | 210/705 |
| 3,516,647 | 6/1970 | Jaffe et al. | 261/122 |
| 3,711,072 | 1/1973 | Waldenville | 261/122 |
| 3,853,986 | 12/1974 | Blass et al. | 261/122 |
| 4,028,229 | 6/1977 | Dell | 210/221.1 |
| 4,431,531 | 2/1984 | Hollingsworth | 210/221.2 |
| 4,495,114 | 1/1985 | Strauss | 210/220 |

FOREIGN PATENT DOCUMENTS

| | | | |
|---|---|---|---|
| 844388 | 6/1970 | Canada | 55/95 |
| 103566 | 2/1917 | United Kingdom | 55/256 |
| 1537034 | 12/1978 | United Kingdom | 261/122 |
| 724207 | 3/1980 | U.S.S.R. | 209/170 |

Primary Examiner—Benoit Castel
Attorney, Agent, or Firm—William T. Hough

[57] ABSTRACT

A method for increasing bubble production enhancing surface area contact of a gas bubbled through a liquid media, with resulting improved agitation and/or purification and/or absorption and/or adsorption and/or reaction.

12 Claims, 6 Drawing Figures

U.S. Patent Nov. 25, 1986 Sheet 1 of 2 4,624,791
FIG. 1 (PRIOR ART)
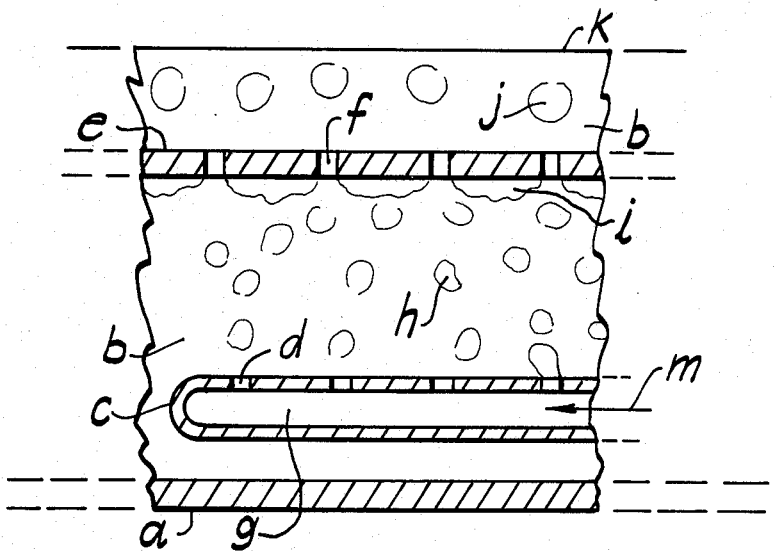
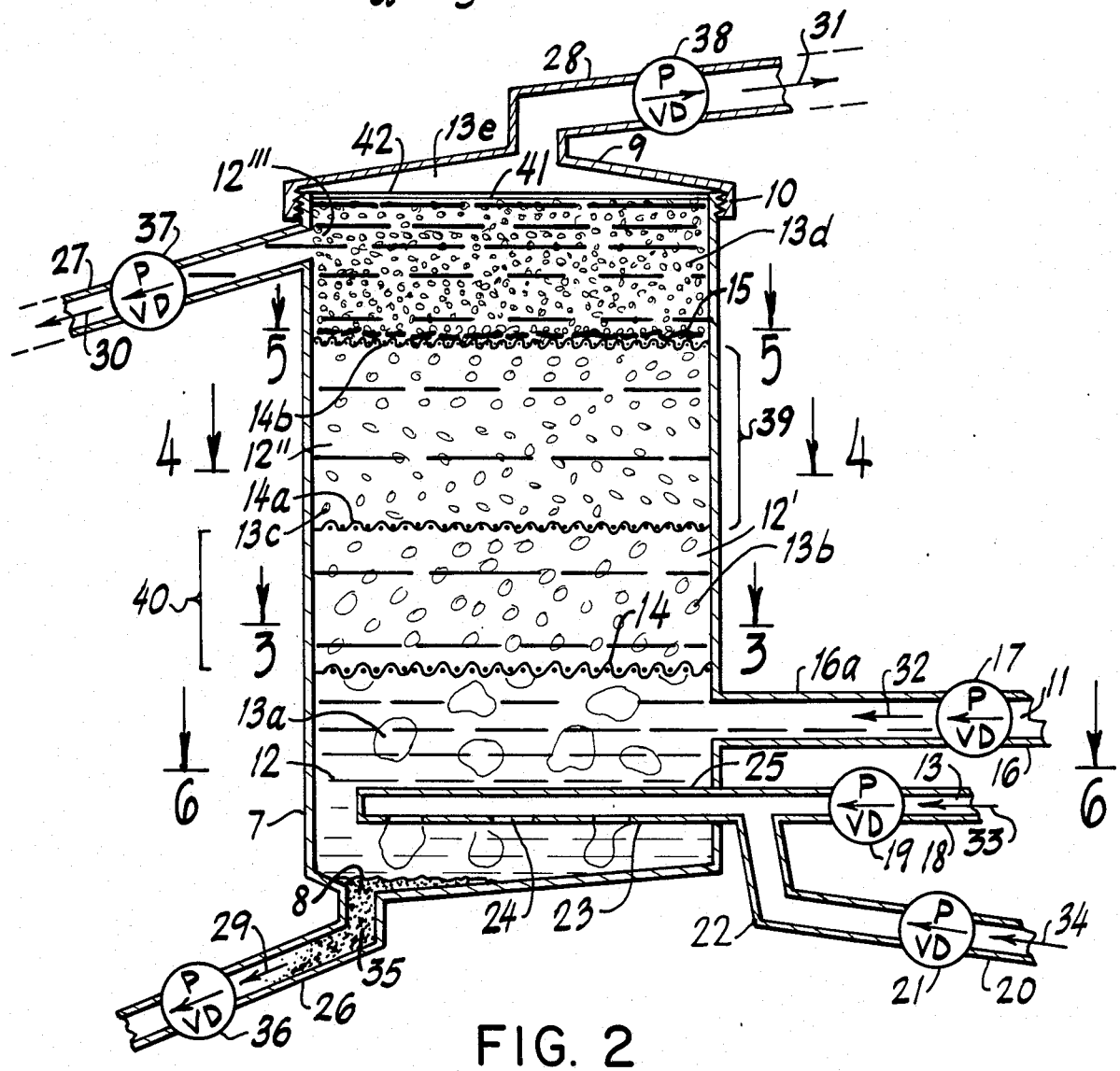
FIG. 2

METHOD FOR IMPROVING BUBBLE SURFACE AREA EXPOSURE

BACKGROUND

Prior to the present invention while bubble production such as through horizontal perforated baffle plates, has been known as a technique, there has not existed any recognition of factors affecting the number and size of the bubbles produced in liquid through which gas is bubbled.

Accordingly, high efficiency has not heretofore been achieved, with the result that larger and more expensive equipments have been required, and/or poor results have been achieved.

OBJECTS

Objects of the invention include the overcoming of one or more problems and/or difficulties noted-above.

Another object is to obtain increased purification and/or adsorption and/or absorption and/or reaction resulting from the passing of gas(es) through a liquid or solids-liquid media.

Another object is to obtain increased bubble production enhancing surface area contact of a gas passed through a liquid and/or solids-liquid media.

Another object is to obtain improved agitation of a liquid or solids-liquid media.

Another object is to obtain improved sewage and/or industrial waste treatment.

Another object is to obtain improved air purification.

Other objects become apparent from preceeding and following disclosure.

One or more preceeding objects are obtained by the present invention as described and illustrated herein.

SUMMARY OF INVENTION

The invention includes a novel method and an apparatus for practicing the novel method. It has been unexpectedly discovered that optimally small and numerous bubbles are obtained by utilizing a plurality of substantially horizontally positioned screens, one over the other within a particular range mesh and or hole-size, positioned spaced a substantial distance below an upper surface of a liquid or solids-liquid composition, above one or more gas outlets, within a vessel. The invention includes and requires critically the use of screens, as opposed to perforated plates which perforated plates were found to be not functional equivalent for purposes of the present invention. Moreover, a single screen does not obtain proportionately equivalent results, a plurality being critically required. The mesh size, expressed in numbers of strands in each of two horizontally traversing direction such as 4×4 mesh represents four strands per inch in each of traverse directions, a 4×4 mesh thus having about ¼ inch between strands, producing a space or hole of about ¼ by ¼ inch, i.e. an aperture of about ¼ inch diameter. The screen mesh size for this invention ranges between about 25×25 mesh down to 4×4 mesh, outside of which there occur complicating phenomenon that significantly critically decrease efficiency and/or render inoperative the inventive improvement. Preferred range is about 20×20 mesh to about 6×6 mesh.

The bottom-most (lower) screen should be reasonably close to the vessel's bottom and likewise the upper-most screen is spaced preferably a major distance below the liquid upper surface in order that the produced bubbles may have a large ascending distance during which contact is made with additional liquid. While the recurring screens (one over the other) to some extent serve to re-divide and/or break-up larger bubbles into smaller bubbles, additionally the recurring screens redivide bubbles that join-together into large bubbles during ascension. Accordingly the better results are attained by greater numbers of screens spaced-apart a distance as small as practical. While as contrasted to perforated plates, problems of collection of gas (air,etc.) below the screen and/or less-frequent large bubble eruptions are not significant problems within the stated wire range of mesh size. When screen mesh is greater than 25×25 mesh (such as 30×30 mesh) large bubbles collect and are trapped under the screen, blocking proper upward gas-flow. Likewise, when screen mesh is below about 4×4(such as 2×2 mesh or ½ inch holes), bubbles produced are by-far too large to achieve optimal surface exposure thereof with the liquid and/or solids thereof.

The present invention preferably utilizes water alone and/or with typically solids dissolved or suspended therein as the liquid media, a major proportion (larger percentage) of the liquid media being water. Such embodiments include an air purifying apparatus in which, for example, carbon particles are supported on one or more screens, serving to extract odors therefrom by adsorption, as well as impurities being dissolved into the water before channeling-off the cleansed air.

In a comparable situation, sewage and/or industrial waste is channeled through the vessel, while being agitated by the air bubbles over an appropriate period of time, thereby facilitating and enhancing bacterial growth in digestion and break-down of the sewer and/or industrial waste, and facilitating oxidation thereof. Simultaneously, the improved bubble-agitation of the bubble media (composition) helps to break up matter into smaller particles, further improving (increasing) surface area exposure to gas. Gas is taken off at the top space, liquid effluent is drawn-off near the top of the vessel, and sediment and/or sludge is pumped-off at the bottom. Lower screens preferably have larger holes (lower mesh) permitting large particles of sludge to settle through the screen.

For water purification the bacterial count may be much more efficiently decreased by bubbling chlorine and/or chlorine admixed with air or nitrogen or the like, into and through the water, and possibly recycling the collected chlorine collected at the top of the vessel.

Preferably a minor effective amount of surfactant (such as detergent or other conventional or desired surfactant) also further enhances bubble production.

The beneficial results of the present invention arise not only from more numerous bubbles, but also from bubbles of reduced size which thereby achieve greater surface area exposure (contact) to surrounding liquid and/or solid-liquid contents. Where accelerated agitation and/or reaction of ingredients is desired, oxygen or oxygen-air admixture may be utilized.

For a particular horizontal cross-section area for tank or vessel, the gas outlets at the bottom-portion of the tank/vessel is preferably branched into a plurality of spaced-apart separate outlets feeding gas upwardly to different screen portions, also resulting in increased bubble production. Preferably gas is directed downwardly as it enters the liquid media resulting in initial bubble being typically smaller size and/or consistent size.

The invention may be better understood by making reference to the following drawings.

THE FIGURES

FIG. 1 represents a prior art perforated plate, collecting air under its bottom surface, and producing much larger bubbles intermittently, shows an in-part view in cross-section.

FIG. 2 illustrates a preferred and typical inventive embodiment, representative symbolically of a sewage treatment apparatus, shown in cross sectional view.

Figure 3:
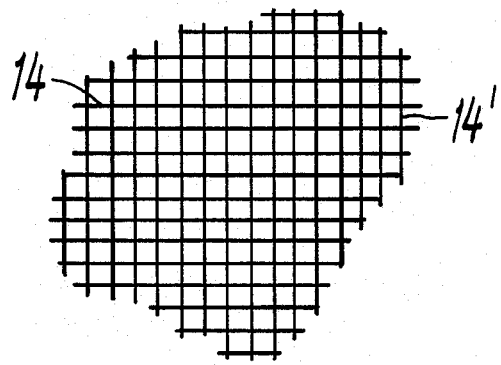
Figure 4:
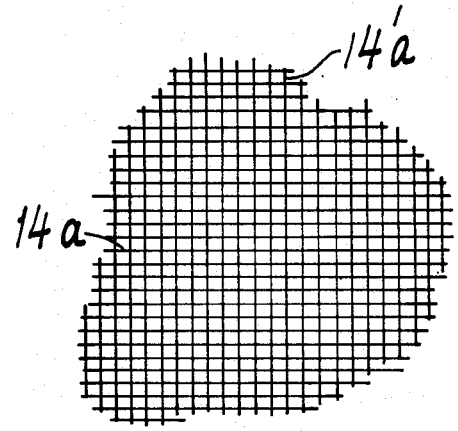
Figure 5:
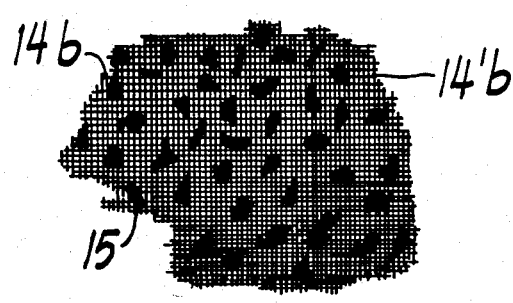

FIGS. 3, 4 and 5 respectively show in-part views as taken along lines 3—3, 4—4, 5—5 respectively of FIG. 1.

Figure 6:
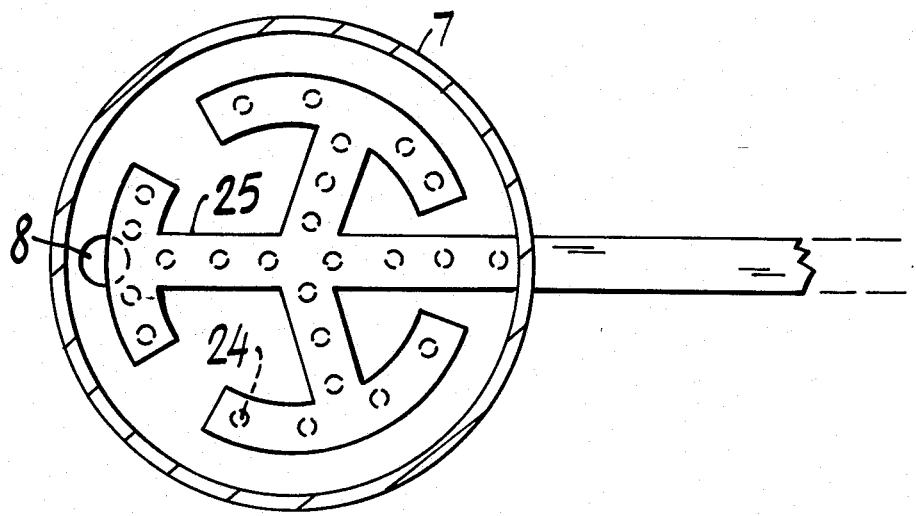

FIG. 6 is a cross-sectional view taken along line 6—6 of FIG. 1, showing the branched gas-outlet with the plurality of downwardly facing outlet vents for passing gas into the liquid and/or solids-liquid within the vessel.

DETAILED DESCRIPTION

Prior art FIG. 1 discloses diagrammatically a vessel a containing a liquid b having therein a gas-furnishing pipe c with upwardly-facing outlets d produceable of large bubbles h and collected gas i beneath plate e having apertures f. Large bubbles j pass upward from apertures f to the liquids upper surface k. The input gas flows in direction m.

FIG. 2 shows a tank (vessel) 7 with sludge bottom-outlet orifice 8 of outlet pipe 26 having variable speed pump 36 pumping in direction 29, pumping-out sludge 35. Tank-top 9 is fastened onto tank 7 at tank-top 42 by male-female threads 10. Sewer pipe 16 furnishes liquid sewer 11 through variable speed pump 17 in direction 32 through sewer inlet-pipe 16a emptying into the vessel's interior at a location beneath screen 14. Air 13 is introduced from air source-pipe 18 in direction 33 through variable speed pump 19 into outlet pipe 25 branching into branch outlets 23 having bottom holes 24. Air bubbles 13a in space 12 come from holes 24, passing through screen 14 as bubbles 13b within space 12; passing through screen 14a as bubbles 13c in space 12; and passing through screen 14 gas bubbles 13d striking carbon particles 15 on screen 14b, passing through space 12''', into gas-collection space 13e, through liquid upper surface 41 and is thereafter pumped through gas-outlet conduit 28 by variable speed pump 38 in direction 31. Decomposition gases also are pumped out here. Other gas such as pure oxygen may be added from typically oxygen-pipe 20 in direction 34 through variable speed pump 21 into accessory gas-feed pipe 22 into pipe 25.

In other embodiments such as for treating water, chlorine gas can be added through a pipe of the type of pipe 20 and 22, for example.

Liquid-sewer effluent in upper-vessel space 12''' is pumped by variable-speed pump 37 through effluent-outlet pipe 30 in direction 30.

It may be seen that mesh openings (apertures) of lower-screen meshes 14 and 14' of FIG. 3 are larger than holes of middle-screen meshes 14a–14a' of FIG. 4, the latter being larger than openings of top-screen meshes 14b–14b' of FIG. 5 having activated carbon particles 15 resting thereon.

FIG. 6 again shows tank 7, sludge outlet 8, gas-branch pipe 25, and downwardly directed outlets 24 (shown in phantom identifying location).

The second screen 14a is spaced-above screen 14 a distance of 40 of at least about ½ inch for lower mesh sizes (larger screen apertures) and at least ¼ inch for larger mesh sizes (smaller screen apertures). For the preferred range, distance 40 is at least about ¼ inch.

EXAMPLE

In tests designed to simulate as nearly as possible a one-to-one comparison, plates having perforations were compared to comparably-sized screens. For example, a screen mesh having a strand every ½ inch will produce an aperture distance of "lesser-than" ½ inch between the strands, i.e. about ⅜ inch. A smaller strand for screen mesh having four per inch results in mesh-distance having about ¼ inch (fractionally less). Twenty strands per inch give apertures of about 0.05 inch (i.e. 1/20 inch), and 30 strands per inch give apertures of about 0.03 inch (i.e. 1/30 inch).

A: Plate-tests:

I. ⅜ inch aperture-diameter; results: ⅜ inch bubble primarily, then mixed with some smaller bubbles. Air pockets were trapped below the plate; air did not distribute evenly under the plate, giving uneven bubble production.

II. ¼ inch aperture-diameter; results: Same as for the ⅜ inch, except primarily ¼ inch bubbles, then mixed with some smaller bubbles; air was trapped below the plate, producing uneven bubble production.

III. 5/32 inch (0.156 inch) aperture-diameter; results: Same as for the ⅜ inch, except smaller bubbles; some air was trapped below the plate, resulting in uneven bubble production.

IV. 1/16 inch (0.0625 inch) aperture-diameter; results: About the same as #III-above, except bubbles were about ⅜ inch diameter, and bubble production was very sparse, with large air mass trapped below the baffle plate, with little bubble penetration through the apertures.

V. 1/32 inch (0.031 inch) aperture-diameter; results: a full air-pocket extending across the plate beneath the plate, with no air-flow nor bubble-production through the apertures what-so-ever.

B: Screen-tests:

I. Mesh aperture (½ inch strand distance) ⅜ inch each direction; results: Bubble action producing bubble of about ⅜ inch diameter and smaller, with full air-flow through the apertures, there being no air trapped below the screen; however, it was observed that bubbles of this large size would not effectively obtain maximal optimal surface-contact with the liquid and matter dissolved and/or suspended therein.

II. Mesh aperture (¼ inch strand distance) ¼ inch in each direction; results: Full-flow bubble action of bubbles of about ¼ inch more or less (some larger, some smaller), the massive bubble production causing a high level of turbulence and mixing-up of the liquid between and above the screens. No air was trapped. Bubbles were perhaps marginally large, perhaps too large for best high-level of surface-contact of air with the liquid and matter dissolved and/or suspended therein.

III. Mesh aperture (mesh 8×8) ⅛ inch (0.05 inch) each direction; results: full flow of bubbles, no air being trapped. This screen(s) gave very great (large) bubble penetration, as compared to the baffle plate 1/16 which did not achieve a very great bubble production and as compared to the 5/32 perforated plate which gave poor results.

IV. Mesh aperture (mesh 20×20) 1/20 inch (0.05) in each direction; results: air flow was good, in bubble production; intermittently small bubbles were trapped momentarily under the screen. Bubble production was very great (high), as compared to perforated plate 1/16 inch.

V. Mesh aperture (mesh 30×30) 1/30 inch (0.03 in.) each direction; results: air flow was limited by larger bubbles trapped under the screen, blocking any significant bubble production, this mesh being too fine (too high mesh).

VI. Mesh aperture (mesh 40×40) 1/40 inch (0.025 inch) each direction; results: no air passage through the screen(s), resulting in all trapped air and no bubble production, this mesh-aperture being too small (too high mesh).

CONCLUSION OF EXPERIMENTS A AND B

The best bubble action in relation to air mass (forced draft) is the screen of 8×8 or smaller apertures (higher mesh number). Perforated plates, or baffled plates are too restrive of air flow, producing poor bubble-production, except for larger holes which suffer from having poor surface-area exposure as compared to small bubbles in large numbers.

While not separately illustrated, another embodiment is an air-purifying apparatus which may be either very large, for industrial plant size, or may be of small backpack size utilizable by firemen and/or forest-fire fighters, and by persons in polluted areas such as in industrial high-dust areas or other industrial and/or hospital polluted-air situations. The small pack would be connected to inlets and outlets of a gas mask-like structure over the nose and/or mouth. The liquid composition may be water and/or aqueous solutions of reactants which neutralize harmful pollutants or adsorb them. The oxygen accessory tube may add natural orygen to supplement the air being purified.

It is within the scope of the invention to make variations and modifications and substitution of equivalents within ordinary skill in this art.

I claim:

1. A method for increasing bubble-production of gas bubbled upwardly through a first liquid composition consisting essentially of a major amount of water relative to lesser total amounts of other liquids and solids within a container vessel in an amount sufficient to permit upward movement of bubbles therethrough, the improvement consisting essentially of placing said liquid into said container vessel, thereafter placing at least two substantially horizontal first and second spaced-apart screens within the liquid at locations spaced a substantially large distance below an upper surface of the liquid sufficiently below said upper surface such that optimally a major amount of surface area contact is obtained by the composition with bubbles produced at said locations by a gas passed upwardly through the screens, placing the second screen at least about $\frac{1}{2}$ inch for lower mesh size thereof down to about $\frac{1}{4}$ inch for higher mesh size thereof above the first screen, utilizing as said first and second screens, screens each having mesh size within a range of from about 25×25 mesh to about 4×4 mesh, U.S. Standard Mesh, and bubbling the gas upwardly through the liquid composition from a plurality of gas outlets located within said container vessel below the first screen from a point within or below the liquid.

2. A method of claim 1, including utilizing screens as the first and second screens, ranging from about 20×20 mesh to about 6×6 mesh, and placing the second screen at least $\frac{1}{4}$ inch above the first screen.

3. A method of claim 2, in which the improvement includes further utilizing oxygen as at-least a part of said gas, as oxygen additive.

4. A method of claim 2, in which the improvement includes utilizing air as a major proportion of said gas, relative to lesser other gases.

5. A method of claim 2, in which the improvement includes utilizing chlorine as a major proportion of said gas, relative to any lesser other gases.

6. A method of claim 3, in which said improvement includes utilizing a solid second composition dissolved-in or suspended within said water.

7. A method of claim 6, in which said improvement includes utilizing a surfactant as at-least a part of said second composition.

8. A method of claim 6, in which said improvement includes utilizing a mixture of sewer effluent and sludge as said second composition.

9. A method of claim 6, in which said second composition comprises odor-containing gaseous impurity and utilizing activated carbon particles adapted to adsorb said gaseous impurity.

10. A method of claim 1, in which said improvement includes placing activated carbon particles onto an upper surface of at-least one of said first and second screens.

11. A method of claim 1, in which said improvement includes utilizing as said second screen a screen having a mesh-size higher than mesh size of said first screen.

12. A method of claim 1, including directing said gas substantially downwardly as the gas enters the first liquid composition as the gas is fed into the first liquid composition.

* * * * *